Patented Dec. 8, 1936

2,063,272

UNITED STATES PATENT OFFICE 2,063,272

ROTPROOF MATERIALS FROM CELLULOSE FIBERS

Fritz Siefert and Hans Kaemmerer, Mannheim, Germany, assignors to General Aniline Works, Inc., New York, N. Y., a corporation of Delaware No Drawing. Application May 10, 1934, Serial No. 725,020. In Germany May 18, 1933

18 Claims. (Cl. 91—68)

The present invention relates to rot-proof materials from cellulose fibers and to a process of making same.

Materials made from vegetable fibers, which are exposed to moist air or which are frequently brought into contact with water, such as sacks, ropes, fishing nets, sails and tents, are rapidly destroyed by reason of the simultaneous action of micro-organisms. It has been proposed to impart a certain protection against rotting to materials of the said kind by impregnation with creosote, tanning materials or copper compounds. The materials are thereby frequently changed in an undesirable manner, however, for example they become hard, tend to become brittle or have an unpleasant odour. Furthermore, since the creosote and the like are not combined in a water-proof manner with the fibers, further disadvantages are met with, as for example soiling by parts of the impregnating agents which become detached.

We have now found that materials which consist of cellulose fibers and which are exposed to the influence of water and the atmosphere can have imparted thereto a high resistance against rotting by incorporating with the said materials azo dyestuffs which have at least two nitro groups in the molecule and have good fastness to light and water. Monoazo dyestuffs as well as polyazo dyestuffs of the said kind may be used for the purpose of the present invention. The tensile strength of the fibers remains unchanged and the disadvantages hereinbefore mentioned do not arise. The azo dyestuffs must have a good fastness to light and water so that their rot-preventing effect remains unimpaired by the influence of weather, light and water. It is advantageous to employ dyestuffs the fastness to light of which is at least 4 and the fastness to water is at least 3 (1 being the lowest degree of fastness; see "Verfahren, Normen und Typen für die Prüfung der Eigenschaften von Färbungen auf Baumwolle usw." Verlag Chemie, 6th edition 1932). The said materials may be charged with the said azo dyestuffs in the usual manner, or azo dyestuffs of the said kind may be produced on the fiber, or in the case of substantive dyestuffs having the said properties they may be brought onto the fiber from a bath as usual. The nitro groups may be contained in the diazo component and/or the coupling component. In order to produce certain colours, as for example on tent material, the dyestuff may be employed together with other dyestuffs; the fibers may also be dyed with other dyestuffs before or after the application of the azo dyestuffs containing nitro groups.

The following examples will further illustrate how this invention is carried out in practice but the invention is not restricted to these examples. The parts are by weight.

Example 1

Fishing net yarn is impregnated with 2.3-hydroxy-naphthoyl-4'-amino-2".4"-dinitrodiphenylamine by treating 1 part of yarn with 20 parts of an aqueous 0.2 per cent bath thereof and introducing the so treated yarn into 20 parts of an aqueous 0.1 per cent solution of the diazo compound of 2-nitro-4-chloraniline, the formation of the dyestuff thus taking place on the fiber. If the yarn thus treated be exposed for 6 weeks to flowing river water, there is no decrease in its tensile strength, whereas untreated yarn exposed in the same manner to the action of river water undergoes a lessening in the tensile strength of about one half. A similar difference is evident with sea water.

Example 2

Awning material is slop-padded with a 1.2 per cent aqueous solution of 2.3-hydroxynaphthoyl-3'-nitraniline and treated with a 2.5 per cent aqueous solution of the diazo compound of 2-nitro-4-chloraniline. Formation of dyestuff thus takes place on the fiber. If the treated material be stored in a moist warm atmosphere for 4 weeks it remains practically unchanged whereas a material of the same kind which has not been treated becomes decayed and brittle.

Example 3

1 part of jute yarn is treated with 20 parts of an aqueous 0.25 per cent solution of 2.3-hydroxynaphthoic acid-2'-hydroxy-3'.5'-dinitroanilide and then with 20 parts of an aqueous 0.15 per cent solution of the diazo compound of 2-nitro-4-chloraniline. The yarn is employed for preparing sacks. The tensile strength of such sacks remains unchanged after lying for four weeks in flowing river water while sacks of the same material which has not been treated have a tensile strength of about one third less after the said time.

Example 4

Hemp yarn is dyed with the dyestuff obtainable by diazotizing picramic acid, coupling with 1-naphthylamine-6-sulphonic acid, diazotizing the resulting azo dyestuff, coupling again with said sulphonic acid, further diazotization and coupling with 2.5-aminonaphthol-7-sulphonic acid. If the treated yarn be worked up into rope it retains its original tensile strength after the action of moisture and warmth for weeks whereas hemp rope prepared from the same yarn which has not been treated becomes brittle after the same time.

*Example 5*

Tent material is slop-padded with a 1 per cent aqueous solution of 2.3-hydroxynaphthoyl-4'-amino - 2".4"-dinitro-5"-hydroxydiphenylamine and then treated with a 1.8 per cent aqueous solution of the diazo compound of 2.6-dichlor-1.4-phenylenediamine. The material thus treated, which may still be rendered waterproof if desired, suffers practically no injury by the action of light and weather.

What we claim is:—

1. The process which comprises impregnating cellulosic fibers of the group consisting of sacks, ropes, fishing nets, sails, tents, and awning material with an azo dyestuff containing at least two nitro groups in its molecule and having good fastness to light and water, in sufficient amount to impart fastness to rotting.

2. The process which comprises impregnating cellulosic fibers of the group consisting of sacks, ropes, fishing nets, sails, tents, and awning material with a monoazo dyestuff containing at least two nitro groups in its molecule and having good fastness to light and water, in sufficient amount to impart fastness to rotting.

3. The process which comprises impregnating cellulosic fibers of the group consisting of sacks, ropes, fishing nets, sails, tents, and awning material with a polyazo dyestuff containing at least two nitro groups in its molecule and having good fastness to light and water, in sufficient amount to impart fastness to rotting.

4. The process which comprises impregnating cellulosic fibers of the group consisting of sacks, ropes, fishing nets, sails, tents, and awning material with an azo dyestuff containing at least two nitro groups in its molecule and the fastness of which to light is at least 4 and the fastness to water at least 3, in sufficient amount to impart fastness to rotting.

5. The process which comprises impregnating cellulosic fibers of the group consisting of sacks, ropes, fishing nets, sails, tents, and awning material with an organic compound capable of coupling and containing at least two nitro groups in its molecule and then with an aqueous solution of an aromatic diazo compound, each in sufficient amount to impart fastness to rotting.

6. The process which comprises impregnating cellulosic fibers of the group consisting of sacks, ropes, fishing nets, sails, tents, and awning material with an organic compound capable of coupling and containing at least one nitro group in its molecule and then with an aromatic diazo compound containing one nitro group in its molecule, each in sufficient amount to impart fastness to rotting.

7. The process which comprises impregnating cellulosic fibers of the group consisting of sacks, ropes, fishing nets, sails, tents, and awning material with an organic compound capable of coupling and containing one nitro group in its molecule and then with an aqueous solution of an aromatic diazo compound containing at least one nitro group in its molecule, each in sufficient amount to impart fastness to rotting.

8. The process which comprises impregnating cellulosic fibers of the group consisting of sacks, ropes, fishing nets, sails, tents, and awning material with an organic compound capable of coupling and then with an aqueous solution of an aromatic diazo compound containing at least two nitro groups in its molecule, each in sufficient amount to impart fastness to rotting.

9. The process which comprises impregnating cellulosic fibers of the group consisting of sacks, ropes, fishing nets, sails, tents, and awning material with an aqueous solution of 2.3-hydroxynaphthoyl-4'-amino-2".4"-dinitrodiphenylamine and then with the diazo compound of 2-nitro-4-chloraniline, each in sufficient amount to impart fastness to rotting.

10. The process which comprises impregnating cellulosic fibers of the group consisting of sacks, ropes, fishing nets, sails, tents, and awning material with an aqueous solution of 2.3-hydroxynaphthoic acid - 2' - hydroxy-3'.5' dinitroanilide and then with the diazo compound of 2-nitro-4-chloraniline, each in sufficient amount to impart fastness to rotting.

11. The process which comprises impregnating cellulosic fibers of the group consisting of sacks, ropes, fishing nets, sails, tents, and awning material with the azo dyestuff obtainable by diazotizing picramic acid, coupling with 1-naphthylamine-6-sulphonic acid, diazotizing the resulting azo dyestuff, coupling again with said sulphonic acid, further diazotization and coupling with 2.5-aminonaphthol-7-sulphonic acid, in sufficient amount to impart fastness to rotting.

12. An article of manufacture which consists of cellulosic fibers of the group consisting of sacks, ropes, fishing nets, sails, tents, and awning material impregnated with an azo dyestuff containing at least two nitro groups in its molecule and having good fastness to light and water, in sufficient amount to impart fastness to rotting.

13. An article of manufacture which consists of cellulosic fibers of the group consisting of sacks, ropes, fishing nets, sails, tents, and awning material impregnated with a monoazo dyestuff containing at least two nitro groups in its molecule and having good fastness to light and water, in sufficient amount to impart fastness to rotting.

14. An article of manufacture which consists of cellulosic fibers of the group consisting of sacks, ropes, fishing nets, sails, tents, and awning material impregnated with a polyazo dyestuff containing at least two nitro groups in its molecule having good fastness to light and water, in sufficient amount to impart fastness to rotting.

15. An article of manufacture which consists of cellulosic fibers of the group consisting of sacks, ropes, fishing nets, sails, tents, and awning material impregnated with an azo dyestuff containing at least two nitro groups in its molecule and the fastness of which to light is at least 4 and the fastness to water at least 3, in sufficient amount to impart fastness to rotting.

16. An article of manufacture which consists of cellulosic fibers of the group consisting of sacks, ropes, fishing nets, sails, tents, and awning material impregnated with the azo dyestuff obtainable by coupling 2.3-hydroxynaphthoyl-4'-amino-2".4"-dinitrodiphenylamine with the diazo compound of 2-nitro-4-chloraniline, in sufficient amount to impart fastness to rotting.

17. An article of manufacture which consists of cellulosic fibers of the group consisting of sacks, ropes, fishing nets, sails, tents, and awning material impregnated with the azo dyestuff obtainable by coupling 2.3-hydroxynaphthoic acid-2'-hydroxy-3'.5'-dinitro-anilide with the diazo compound of 2-nitro-4-chloraniline, in sufficient amount to impart fastness to rotting.

18. An article of manufacture which consists of cellulosic fibers of the group consisting of sacks, ropes, fishing nets, sails, tents, and awning material impregnated with the azo dyestuff obtainable by diazotizing picramic acid, coupling with 1-naphthylamine-6-sulphonic acid, diazotizing the resulting azo dyestuff, coupling again with said sulphonic acid, further diazotization and coupling with 2.3-aminonaphthol-7-sulphonic acid, in sufficient amount to impart fastness to rotting.

FRITZ SIEFERT.
HANS KAEMMERER.